(12) United States Patent
Klapwald

(10) Patent No.: US 10,215,448 B2
(45) Date of Patent: Feb. 26, 2019

(54) HEAT RECEIVER TUBE, METHOD FOR MANUFACTURING THE HEAT RECEIVER TUBE, SOLAR COLLECTOR WITH THE HEAT RECEIVER TUBE AND METHOD FOR PRODUCING ELECTRICITY BY USING THE SOLAR COLLECTOR

(71) Applicant: Siemens Concentrated Solar Power Ltd., Rosh Ha'ayin (IL)

(72) Inventor: Shmulik Klapwald, Jerusalem (IL)

(73) Assignee: Siemens Concentrated Solar Power Ltd. (IL)

( * ) Notice: Subject to any disclaimer, the term of this patent is extended or adjusted under 35 U.S.C. 154(b) by 119 days.

(21) Appl. No.: 15/338,615

(22) Filed: Oct. 31, 2016

(65) Prior Publication Data
US 2017/0122622 A1    May 4, 2017

(30) Foreign Application Priority Data
Nov. 2, 2015   (EP) .................................... 15192558

(51) Int. Cl.
| | |
|---|---|
| *F24S 40/80* | (2018.01) |
| *F24S 10/40* | (2018.01) |
| *F24S 23/70* | (2018.01) |
| *B23P 15/26* | (2006.01) |
| *F24S 40/57* | (2018.01) |

(52) U.S. Cl.
CPC ................ *F24S 10/45* (2018.05); *B23P 15/26* (2013.01); *F24S 23/70* (2018.05); *F24S 40/57* (2018.05); *F24S 40/80* (2018.05); *Y02E 10/44* (2013.01)

(58) Field of Classification Search
CPC ..................... F24J 2/55; F24J 2/46; F24J 2/14
USPC ...................... 126/654, 635, 590; 417/51, 53
See application file for complete search history.

(56) References Cited

U.S. PATENT DOCUMENTS

| | | | |
|---|---|---|---|
| 4,523,578 A * | 6/1985 | Mahdjuri Sabet | ....... F24J 2/055 |
| | | | 126/658 |
| 4,886,048 A | 12/1989 | Harats | |
| | | (Continued) | |

FOREIGN PATENT DOCUMENTS

WO    WO 2015151774 A1    10/2015

OTHER PUBLICATIONS

Extented European Search Report for application No. 15192558.3, dated Mar. 31, 2016.

*Primary Examiner* — Gregory Huson
*Assistant Examiner* — Nikhil Mashruwala
(74) *Attorney, Agent, or Firm* — Schmeiser, Olsen & Watts LLP

(57) ABSTRACT

A heat receiver tube for absorbing solar energy and for transferring absorbed solar energy to a heat transfer fluid which can be located inside of at least one core tube of the heat receiver tube is provided. The core tube includes a core tube surface with at least one solar energy absorptive coating for absorbing solar radiation. The core tube is enveloped by at least one enveloping tube. The enveloping tube includes at least one enveloping tube wall which is at least partly transparent for the solar radiation. The enveloping tube wall includes at least one inner enveloping tube surface. The core tube and the enveloping tube are coaxially arranged to each other such that an inner heat receiver tube space is formed which is bordered by the core tube surface (and the inner enveloping tube surface.

18 Claims, 2 Drawing Sheets

(56) References Cited

U.S. PATENT DOCUMENTS

| | | | | |
|---|---|---|---|---|
| 6,832,608 B2* | 12/2004 | Barkai | ............... | F24J 2/055 |
| | | | | 126/653 |
| 8,602,021 B2* | 12/2013 | Davis | ............... | F24J 2/055 |
| | | | | 126/655 |
| 9,404,674 B2* | 8/2016 | Kuckelkorn | ............... | F24J 2/055 |
| 9,869,491 B2* | 1/2018 | Boyle | ............... | F24J 2/055 |
| 9,920,956 B2* | 3/2018 | Kuckelkorn | ............... | F24J 2/4616 |
| 9,939,176 B2* | 4/2018 | Kuckelkorn | ............... | F24J 2/055 |
| 2012/0211003 A1 | 8/2012 | Kuckelkorn | | |
| 2017/0108244 A1* | 4/2017 | Matsudo | ............... | F24J 2/055 |
| 2017/0122621 A1* | 5/2017 | Klapwald | ............... | F24J 2/055 |

* cited by examiner

HEAT RECEIVER TUBE, METHOD FOR MANUFACTURING THE HEAT RECEIVER TUBE, SOLAR COLLECTOR WITH THE HEAT RECEIVER TUBE AND METHOD FOR PRODUCING ELECTRICITY BY USING THE SOLAR COLLECTOR

CROSS-REFERENCE TO RELATED APPLICATIONS

This application claims priority to European Application No. 15192558.3, having a filing date of Nov. 2, 2015, the entire contents of which are hereby incorporated by reference.

FIELD OF TECHNOLOGY

This following relates to a heat receiver tube, a method for manufacturing the heat receiver tube, a solar collector with the heat receiver tube and a method for producing electricity by using of the solar collector.

BACKGROUND

A sun energy collecting unit (solar collector) of a sun field power plant based on the concentrated solar power technique is for instance a solar collector with a parabolic mirror and a heat receiver tube. The heat receiver tube is arranged in a focal line of a solar radiation (sunlight) reflecting surface of the mirror. By the solar radiation reflecting surface sunlight is collected and focused to the heat receiver tube.

The heat receiver tube comprises a core tube (inner tube, e.g. made of stainless steel) which is filled with a heat transfer fluid, e.g. a thermo-oil or molten salt. With the aid of a solar radiation absorptive coating of the core tube the heat receiver tube absorbs energy from the sun. Energy from the sun is efficiently coupled into the heat transfer fluid. Solar energy is converted into thermal energy.

In order to minimize a loss of thermal energy, the heat receiver tube comprises an encapsulation with an enveloping tube. The enveloping tube envelops the core tube.

For instance, the enveloping tube is a glass tube. This enveloping tube is at least partly transparent for solar radiation. So, solar radiation can impinge the solar radiation absorptive coating of the core tube.

The core tube and the enveloping tube are coaxially arranged to each other resulting in an inner space of the heat receiver tube which is bordered by a core tube surface of the core tube and by an inner enveloping tube surface of an enveloping tube wall of the enveloping tube.

The inner space of the heat receiver tube between the inner tube and the enveloping tube is evacuated in order to minimize convection and hence in order to minimize a thermal loss of the heat receiver tube. The inner heat receiver tube space is a vacuum chamber.

One problem is a degradation of the heat transfer fluid during operation for years. By the degradation Hydrogen ($H_2$) is formed. This Hydrogen permeates through the stainless steel wall of the core tube into the evacuated inner space of the heat transfer fluid. The result is a collapse of the vacuum of the inners space of the heat receiver tube and hence an increase of the thermal loss of the heat receiver tube.

SUMMARY

An aspect relates to ensuring low thermal loss during the operation of a heat receiver tube.

A further aspect relates to providing a method for manufacturing the heat receiver tube, a solar collector with the heat receiver tube and a method for producing electricity by using the solar collector.

With embodiments of the invention a heat receiver tube for absorbing solar energy and for transferring absorbed solar energy to a heat transfer fluid which can be located inside of at least one core tube of the heat receiver tube is provided. The core tube comprises a core tube surface with at least one solar energy absorptive coating for absorbing solar radiation. The core tube is enveloped by at least one enveloping tube. The enveloping tube comprises at least one enveloping tube wall which is at least partly transparent for the solar radiation. The enveloping tube wall comprises at least one inner enveloping tube surface. The core tube and the enveloping tube are coaxially arranged to each other such that an inner heat receiver tube space is formed which is bordered by the core tube surface and the inner enveloping tube surface. The heat receiver tube comprises at least one pressure adapting device (which may alternately be referred to as "pressure compensating device" or "pressure device") for adapting a space pressure of the inner heat receiver tube space and an environmental pressure of an environment of the heat receiver tube. With the aid of the pressure adapting device pressure compensation between the space pressure and the environmental pressure is possible.

For instance, the inner core tube comprises a core tube wall which is made of stainless steel. The enveloping tube which is transparent for the sunlight (transmission for specific wavelengths more the 90%) is arranged coaxially around the inner core tube of the heat receiver tube. The enveloping tube is preferably made of glass. The enveloping tube wall comprises glass. But other transparent materials are possible, too.

The core tube surface and the inner enveloping tube surface are preferably oppositely arranged to each other. The result is a heat receiver tube chamber.

In a preferred embodiment, the space pressure comprises a partial pressure of hydrogen. For the space pressure, the partial pressure of hydrogen is decisive. As described above, hydrogen in the heat receiver tube results in a deterioration of the thermal characteristics of heat receiver tube. With the aid of embodiments of the invention, the partial pressure of hydrogen is reduced and hence the hydrogen induced deterioration. The thermal loss of the heat receiver tube is reduced.

In a preferred embodiment, the pressure adapting device comprises at least one opening for connecting the inner heat receiver tube space and the environment. With the aid of the opening a compensation of the pressures is possible by exchange of gases of the inner space and of the environment. For instance, air of the environment is guided into the inner space via the opening. For that, it is advantageous that the solar energy absorptive coating is resistant to air. Preferably, the opening (comprises an opening dimension (opening width) which is selected from the range between 1 mm and 20 mm and preferably selected from the range between 2 mm and 10 mm. For instance, the opening is an opening of an opening width of 15 mm.

In a preferred embodiment, the heat receiver tube comprises least one dimension adapting device with a flexible adapting device wall for compensation of a thermally induced change of at least one dimension of the heat receiver tube. Preferably, the dimension adapting device comprises bellows and the flexible adapting device wall comprises a bellows wall. The bellows are preferably arranged at a front side of the heat receiver tube.

In a preferred embodiment, the enveloping tube and the dimension adapting device are covered by at least one heat receiver tube skirt with at least one heat receiver tube skirt wall.

In a preferred embodiment, the flexible adapting device wall and/or the heat receiver tube skirt wall comprise at least one metal. Preferably, these walls are made of metal, for instance stainless steel. Metal has the advantage that it is resistant to high temperatures. In addition, metal is quite flexible (in comparison to other materials like ceramics)

The pressure adapting device or a plurality of pressure adapting device can be arranged at different locations of the heat receiver tube. In a preferred embodiment, the enveloping tube wall and/or the bellows wall and/or the heat receiver tube skirt wall comprise the pressure adapting device. For instance, the pressure adapting device is an opening. The mentioned walls can comprise respective openings.

In a preferred embodiment, the pressures adapting device comprises at least one particle filter for avoiding an infiltration of particles of the environment into the inner heat receiver tube space. For instance, such a filter is a dust filter. Dust particles cannot move into the inner space.

The particle filter is made of suitable filter material. Such filter material is resistant to high temperatures. For instance, metal is a suitable filter material.

In a preferred embodiment, the particle filter comprises at least one ceramic material. The filter material is ceramic.

In addition, a method for manufacturing a heat receiver tube with following steps is provided: a) providing of at least one heat receiver tube and b) arranging of at least one pressure adapting device at the heat receiver tube for adapting a space pressure of the inner heat receiver tube space and an environmental pressure of an environment of the heat receiver tube.

Moreover, a solar collector is provided which comprises at least one mirror having a solar radiation reflecting mirror surface for directing the solar radiation to a focal line of the solar radiation reflecting mirror surface and at least one heat receiver tube which is arranged in the focal line of the solar radiation reflecting mirror surface. Preferably, the mirror is a parabolic mirror or a Fresnel mirror. The mirror is a parabolic mirror with a parabolic shaped solar radiation reflecting mirror surface. Alternatively the mirror is a Fresnel mirror. Thereby it is not necessary, that the heat receiver tube is exactly located in the focal line of the mirror. Aberrations from an exact arrangement in the focal line are possible, too.

In addition, a method for producing electricity by using the solar collector in a solar thermal power plant for converting solar radiation into electrical energy, wherein an absorbing of the solar radiation is carried out with the aid of the solar collector.

For the introduction of the opening, there are different possibilities. Advantageous is the drilling of a hole. Therefore, in a preferred embodiment, the arranging of the pressure adapting device comprises a drilling into at least one of the walls of the heat receiver tube. Preferably the drilling comprises a laser drilling.

Finally a use of the solar collector in a solar thermal power plant for converting solar energy into electrical energy is disclosed. Thereby an absorbing of the sunlight energy is carried out with the aid of the solar collector.

Solar radiation is converted into thermal energy of a heat transfer fluid which is located in the core tube. The heat transfer fluid is a thermo-oil or a molten salt. Via a heat exchanger thermal energy of the heat transfer fluid is used to produce steam. This steam drives a turbine which is connected to a generator. The generator produces current.

One specific advantage of embodiments of the invention has to be noted: With the aid of embodiments of the invention it is possible to maintain proper thermal characteristics of the heat receiver tube. It is not necessary to exchange the heat receiver tube after a couple of years of operation.

BRIEF DESCRIPTION OF THE DRAWINGS

Some of the embodiments will be described in detail, with reference to the following figures, wherein like designations denote like members, wherein.

DETAILED DESCRIPTION

Figure 1:
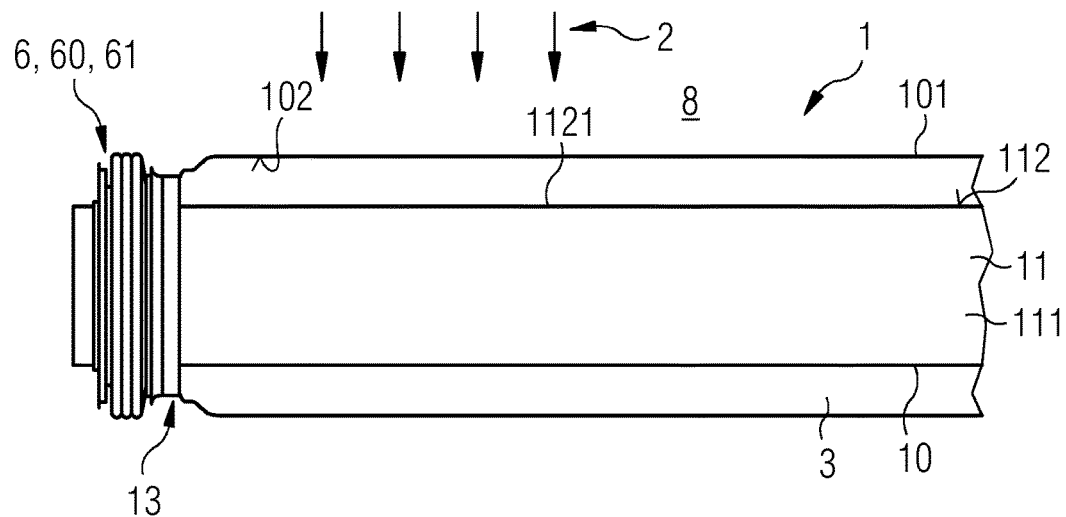
FIG. 1 shows cross sections of a heat receiver tube.

Given is a heat receiver tube 1. The heat receiver tube 1 comprises a core tube 11 stainless steel. The core tube 11 comprises a core tube surface 112 with at least one solar energy absorptive coating for absorbing solar radiation 113 of the sunlight In the core tube 11 a heat transfer fluid 111 can be located. The heat transfer fluid 111 is a thermo-oil. Alternatively the heat transfer fluid 111 is molten salt.

The enveloping tube 10 comprises an enveloping tube wall 101 out of glass. This enveloping tube wall is transparent for the solar radiation 113. The enveloping tube wall 101 comprises an inner enveloping tube surface 102, the external surface is coated by an AR layer (anti reflecting coating).

The core tube 11 and the enveloping tube 10 are coaxially arranged to each other. The core tube surface 112 and the inner enveloping tube surface 102 arranged face to face. By this an inner heat receiver tube space 12 results which is bordered by the core tube surface 112 and the inner enveloping tube surface 102.

The core tube and the enveloping tube are coaxially arranged to each other such that an inner heat receiver tube space is formed which is bordered by the core tube surface and the inner enveloping tube surface.

The heat receiver tube comprises at least one pressure adapting device for adapting a space pressure of the inner heat receiver tube space and an environmental pressure of an environment of the heat receiver tube.

Figure 2:
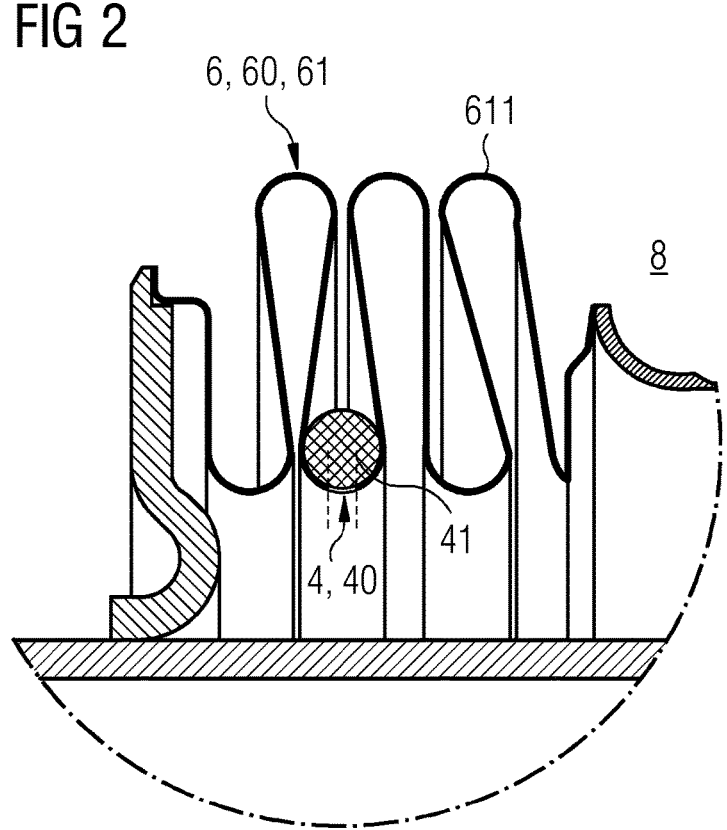
FIG. 2 shows cross sections of a heat receiver tube of a first embodiment.

First Embodiment: The pressure adapting device comprises an opening (hole) which is drilled into the bellows wall of bellows (FIG. 2). The opening comprises an opening dimension 401 of about 15 mm. The opening is covered by a particle filter 41. The particle filter is a ceramic particle filter. In an alternative embodiment, the particle filter is a metal filter.

Figure 3:
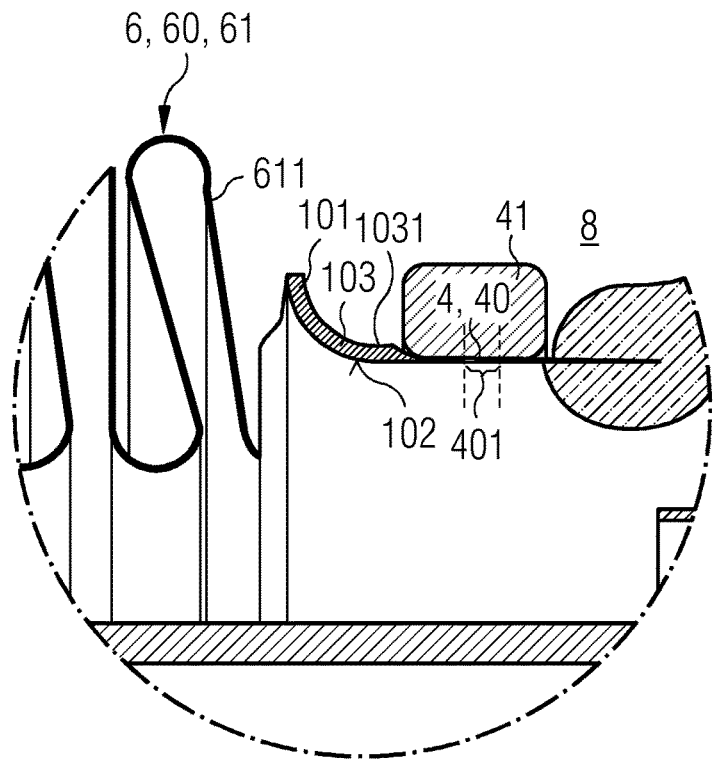
FIG. 3 shows cross sections of a heat receiver tube of a second embodiment.

Second Embodiment: The pressure adapting device comprises an opening which is drilled into a skirt which covers (partly) the bellows and the enveloping glass tube (FIG. 3). Again, the opening is covered by a ceramic filter. Alternatively, the particle filter is a metal filter.

The solar collector is used in a solar thermal power plant for converting solar energy into electrical energy. The heated heat transfer fluid is used to produce steam via a heat exchanger. The steam is driving a turbine, which is connected to a generator. The generator produces current.

Figure 4:
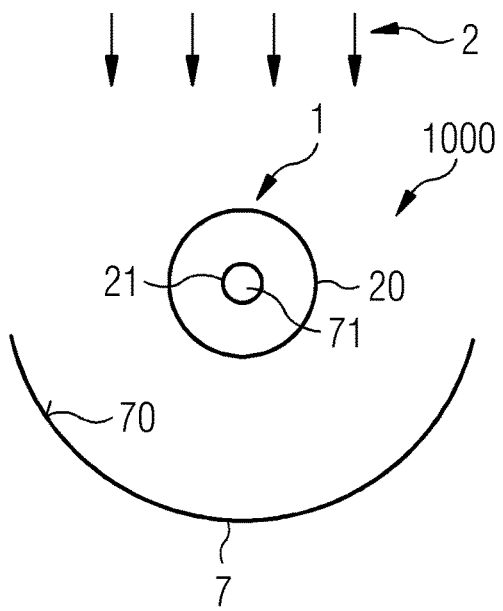
FIG. 4 shows a cross section of a parabolic through collector (solar collector) with the heat receiver tube.

The heat receiver tube 1 is part of a solar collector (parabolic trough collector) 1000. The solar collector 1000 comprises at least one parabolic mirror 7 with a sunlight reflective surface 70. By the solar radiation reflecting surface 70 sunlight 2 is directed to the focal line 71 of the parabolic mirror 7. The concentrated sunlight is absorbed by the heat receiver tube 1 (FIG. 4).

The heat receiver tube 1 is arranged on the side of the incoming direct sunlight radiation 2.

The solar collector 1000 is used in a solar thermal power plant for converting solar energy into electrical energy. The heated heat transfer fluid is used to produce steam via a heat exchanger. The steam is driving a turbine, which is connected to a generator. The generator produces current (electric energy).

Although the present invention has been disclosed in the form of preferred embodiments and variations thereon, it will be understood that numerous additional modifications and variations could be made thereto without departing from the scope of the invention.

It should be noted that the use of "a" or "an" throughout this application does not exclude a plurality, and "comprising" does not exclude other steps or elements. Also elements described in association with different embodiments may be combined. It should also be noted that reference signs in the claims should not be construed as limiting the scope of the claims.

The invention claimed is:

1. A heat receiver tube for absorbing solar energy and for transferring absorbed solar energy to a heat transfer fluid which can be located inside of at least one core tube of the heat receiver tube, wherein the at least one core tube comprises a core tube surface with at least one solar energy absorptive coating for absorbing solar radiation;
    the at least one core tube is enveloped by at least one enveloping tube;
    the enveloping tube comprises at least one enveloping tube wall which is at least partly transparent for the solar radiation;
    the enveloping tube wall comprises at least one inner enveloping tube surface;
    the at least one core tube and the enveloping tube are coaxially arranged to each other such that an inner heat receiver tube space is formed which is bordered by the core tube surface and the at least one inner enveloping tube surface; and
    the heat receiver tube comprises at least one pressure adapting device for adapting a space pressure of the inner heat receiver tube space compensating to an environmental pressure of an environment of the heat receiver tube.

2. The heat receiver tube according to claim 1, wherein the space pressure comprises a partial pressure of hydrogen.

3. The heat receiver tube according to claim 1, wherein the at least one pressure adapting device comprises at least one opening for connecting the inner heat receiver tube space and the environment.

4. The heat receiver tube according to claim 3, wherein the opening comprises an opening dimension which is selected from the range between 1 mm and 20 mm.

5. The heat receiver tube according to claim 1, wherein the enveloping tube wall comprises glass.

6. The heat receiver tube according to claim 1, wherein the heat receiver tube comprises at least one dimension device with a flexible device wall for compensation of a thermally induced change of at least one dimension of the heat receiver tube.

7. The heat receiver tube according to claim 6, wherein the device comprises bellows and the flexible device wall comprises a bellows wall.

8. The heat receiver tube according to claim 7, wherein the bellows are arranged at a front side of the heat receiver tube.

9. The heat receiver tube according to claim 6, wherein the enveloping tube and the dimension device are covered by at least one heat receiver tube skirt with at least one heat receiver tube skirt wall.

10. The heat receiver tube according to claim 6 wherein the flexible device wall and/or the heat receiver tube skirt wall comprise at least one metal.

11. The heat receiver tube according to claim 1, wherein the enveloping tube wall and/or the bellow wall and/or the heat receiver tube skirt wall comprise the pressure adapting device.

12. The heat receiver tube according to claim 1, wherein the pressure adapting device comprises at least one particle filter for avoiding an infiltration of particles of the environment into the inner heat receiver tube space.

13. The heat receiver tube according to claim 12, wherein the particle filter comprises at least one ceramic material.

14. Method for manufacturing a heat receiver tube with following steps:
    a) providing of at least one heat receiver tube; and
    b) arranging of at least one pressure device at the at least one heat receiver tube for allowing air of an environment surrounding the heat receiver tube to be guided into the heat receiver tube for compensating a space pressure.

15. The method according to claim 14, wherein the arranging of the pressure device comprises a drilling of a hole into at least one of the walls of the heat receiver tube.

16. A solar collector comprising at least one mirror having a sunlight reflecting mirror surface for directing sunlight to a focal line of the sunlight reflecting mirror surface; and
    at least one heat receiver tube according to claim 1 which is arranged in the focal line of the sunlight reflecting mirror surface.

17. The solar collector according to claim 16, wherein the mirror is a parabolic mirror or a Fresnel mirror.

18. The method for producing electricity by using the solar collector according to claim 15 in a solar thermal power plant for converting solar energy into electrical energy, wherein an absorbing of the sunlight energy is carried out with the aid of the solar collector.

* * * * *